Nov. 28, 1933.  O. H. STARNER ET AL  1,937,172
IRRIGATING IMPLEMENT
Filed April 19, 1933
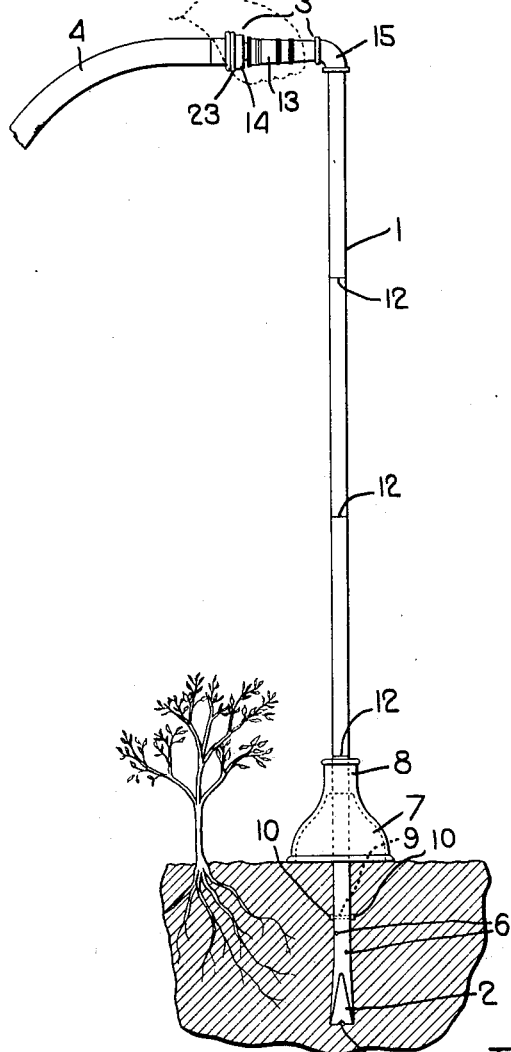
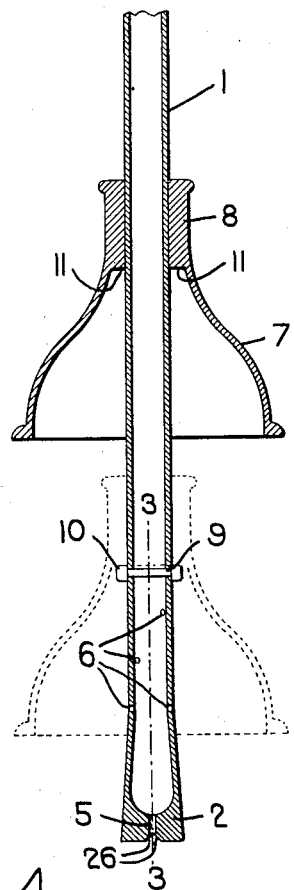
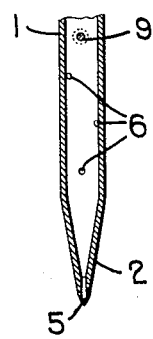
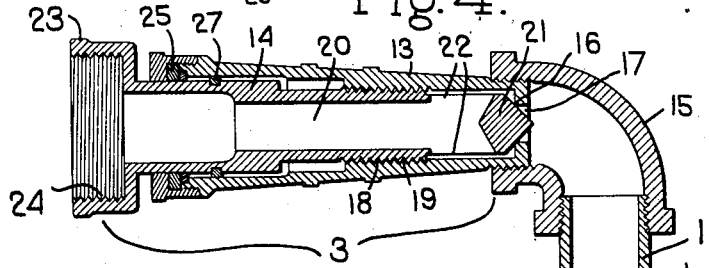
Inventors.
Otis H. Starner
Herbert P. Starner
by Heard Smith & Tennant.
Attys.

Patented Nov. 28, 1933

1,937,172

UNITED STATES PATENT OFFICE 1,937,172

IRRIGATING IMPLEMENT

Otis H. Starner, Carlisle, Pa., and Herbert P. Starner, Scarsdale, N. Y.

Application April 19, 1933. Serial No. 666,870

4 Claims. (Cl. 47—49)

This invention relates to an irrigating implement of that type which comprises a tubular stem pointed at its lower end and adapted to be inserted into the soil adjacent the roots of the plant or shrub to be irrigated and which is provided with discharge openings adjacent its pointed end and with a hose connection at its upper end through which water may be introduced into the stem.

Some of the objects of the present invention are to provide an irrigating implement of this type in which the point has a novel shape adapted to facilitate the penetration of the implement into the soil; to provide a simple irrigating implement of this type which is shaped similar to a cane and can be similarly handled; to provide an improved irrigating implement in which the handle of the can-shaped device is provided with a valve controlling the flow of water through the tube, which valve can be opened and closed by a simple turning of the wrist and without releasing the handle; to provide an irrigating implement of this type which is equipped with a guard which normally encircles or surrounds the lateral discharge ports adjacent the tip of the cane, and which prevents wetting of the operator in case the implement is carried from place to place with the water turned on; to provide a novel shield or anti-splash device which is flexible and will thus conform to inequalities in the ground, and which also functions as an indicator to indicate the depth to which the implement is inserted into the soil.

In order to give an understanding of the invention we have illustrated in the drawing a selected embodiment thereof which will now be described after which the novel features will be pointed out in the appended claims.

Fig. 1 is a view illustrating an irrigating implement embodying the invention and showing it in use;

Fig. 2 is an enlarged fragmentary sectional view of the pointed end of the instrument;

Fig. 3 is a section on the line 3—3, Fig. 2;

Fig. 4 is a section through the valved handle of the implement;

The irrigating implement herein shown comprises a tubular stem 1 having a wedge-shaped lower end 2, said wedge-shaped end being closed except for water delivery ports presently to be described. At the upper end the stem 1 is provided with a handle portion, indicated generally at 3, which handle portion preferably extends at substantially right angles to the stem 1 and thus forms a cane-shaped implement, said handle portion 3 having a water passage therethrough communicating with the interior of the stem 1 and having provision for the attachment of a hose 4 to the end thereof.

The lower wedge-shaped end 2 of the stem 1 is provided with a central delivery port 5 which is preferably situated centrally of the wedge-shaped end or axially of the tubular stem 1, said port leading through the edge or tip of the wedge. The stem is also provided with a plurality of lateral delivery ports 6 which are situated slightly above but adjacent the wedge-shaped end 2.

It will be understood that in using the implement the wedge-shaped end is inserted into the soil adjacent the roots of the plant, shrub, or tree to be watered or irrigated and water is allowed to flow through the hose 4 and stem 1 to accomplish the desired irrigating operation.

In using the device the operator grasps the handle portion 3 as he would a cane and by applying downward pressure on the handle the tube may be inserted into the soil. The wedge shape of the point 2 is advantageous, partly because it can be forced past obstacles in the soil more easily than a cone-shaped point, and partly because it does not tend to pack the soil in front of the point. The advantage of having the port 5 extending through the point and emerging therefrom at the edge of the wedge shape is that the water issuing from this port softens the earth directly in front of the tip and tends to wash a hole in the soil to receive the tip. This facilitates materially the penetration of the implement into the soil and obviates the necessity of using a hammer, mallet or other implement for driving the tubular stem into the soil. Furthermore, we have found from experience that the water-delivery port 5 located at the edge of the wedge does not become plugged up by soil.

The wedge shape has the further advantage that if the soil into which the implement is to be inserted is hard and firmly compacted it is possible to facilitate the insertion of the implement through such hard soil by using the wedge-shaped end 2 somewhat on the order of a drill, that is, by repeatedly withdrawing the implement slightly and then forcing it down against the hard soil and meanwhile turning the implement about its axis. During this operation the stream of water issuing from the port 5 has a softening tendency on the hard soil and the repeated impacts of the wedge-shaped end against the hard soil tend to cut into the softened soil and the operation of turning the implement about its axis prevents the soil from becoming packed in front of the wedge-shaped point.

The port 5 is shown as widened somewhat at its delivery end as indicated at 26, this being accomplished by forming a V-shaped notch in the edge of the wedge shape. The advantage of this is that the jet of water issuing from the port 5 tends to spread or diverge somewhat.

Associated with the tubular stem 1 is a guard member 7 herein shown as a bell-shaped device provided with a neck 8 having an aperture through which the stem 1 passes. This guard member 7 is free to move longitudinally of the stem and the latter is provided with a stop device 9 to limit its downward movement on the stem. This stop device is in the form of a pin extending through the stem 1 and provided at each end with a head 10. This stop device cooperates with the shoulder 11 at the lower end of the neck 8 to limit downward movement of the guard on the stem. When the guard is in its lowered position resting against the stop 9 the skirt portion of the guard encloses the lateral apertures 6 as shown by dotted lines in Fig. 2, and when the guard is in this position it intercepts the jets issuing from the lateral ports 6 so that a person can carry the irrigating implement from place to place with the water still flowing through the implement without danger of getting wet from the lateral sprays issuing from the ports 6. The water which issues from the end port 5 will, of course, be directed in the axial line of the stem.

Said guard member also serves to prevent the jets of water which issue from the lateral opening 6 from being sprayed onto flowers or foliage while the implement is being carried from one point to another or when it is being introduced into the ground. It is a well known fact that the spraying of water onto flowers, plants, foliage, grass, etc. when the sun is shining brightly often injures the flowers or foliage. The guard member prevents the lateral jets of water from being sprayed onto grass or flowers and thus the irrigating implement can be safely used for irrigating purposes at any time regardless of whether or not the sun is shining and also regardless of wind conditions.

This guard member 7 also has the further advantage that when the implement is to be inserted into the ground and the point thereof is first placed against the ground, said guard intercepts the jets issuing laterally from the ports 6 and deflects such jets downwardly onto the surface of the earth immediately circumjacent the point. Therefore, under these circumstances all the water which is being delivered from the implement is directed onto the surface of the earth at the point where the implement is to be inserted. This produces a maximum softening effect on the earth which facilitates the insertion of the implement therein.

For irrigating different plants it is desirable to insert the implement into the soil to different extents dependent on the nature of the plant. In irrigating plants with shallow roots it is sufficient to insert the implement into the soil a relatively small distance. For irrigating shrubs and some other plants with medium-sized roots it is desirable to insert the implement a greater distance into the soil, and for irrigating trees it is desirable to insert the instrument a still greater distance into the soil. In the present embodiment of our invention the guard 7 not only functions as a splash guard in the manner above described but it also serves as a gage to indicate the depth to which the implement has been inserted into the soil. When the instrument is inserted into the soil the guard 7 will rest on the surface of the earth as shown in Fig. 1 and during the penetrating thrust of the implement the stem will slide through the neck of the guard.

We propose to provide the stem 1 with a plurality of indication marks such as shown at 12 in Fig. 1 and by observing the position of these various indication marks relative to the upper end of the neck of the guard member 7, it is possible to determine the depth to which the implement has been forced into the soil.

The shrubs, plants, etc. which are to be irrigated may roughly be divided into three classes, as follows:

(1) Those with shallow roots;
(2) Those with roots of medium depth;
(3) Those with deep roots.

For practical purposes it may be sufficient to provide the stem 1 with three indicating marks 12, one for each of the above classes of plants. In irrigating a shallow root plant it will be sufficient to insert the implement into the ground until the lower indicating mark 12 comes into line with the top of the neck 8 of the guard 7 which is resting on the ground. For plants having roots of medium depth the implement will be inserted until the central indicating mark 12 comes into alignment with the top of the guard, and for the deep root plants or trees the implement will be still further inserted until the upper indicating mark comes into line with the top of the guard member.

We have stated above that the handle portion 3 of the implement extends at substantially right angles to the stem and thus the stem 1 and handle 3 simulate an ordinary cane in shape.

In the invention herein shown the handle 3 has a valve associated therewith which controls the flow of water through the tubular member 1 and this valve is constructed so that it can be manipulated by a simple turn of the wrist of the hand which grasps the handle. As shown in Fig. 4 the handle portion 3 comprises the two sections 13 and 14 which are mounted for rotation relative to each other.

The section 13 is a non-rotary member, it being shown as screw threaded into an elbow 15 which connects said member 13 to the upper end of the tubular stem 1. This non-rotary member 13 is formed with a valve seat 16 surrounding a port 17.

The member 14 is rotatively mounted, it being shown as having an exteriorly screw-threaded portion 18 which screw threads into an interiorly screw-threaded portion 19 of the non-rotary member 3. The rotary member 14 is formed with the axial water passage 20 and it carries at its end a valve member 21 adapted to seat against the valve seat 16, said member 14 having the lateral ports 22 communicating with the axial water passage 20. The outer end of the rotary member 14 is provided with means for the attachment of the hose 4.

As herein shown the outer end 23 of the member 14 which extends beyond the non-rotary member 13 is enlarged in diameter and is provided with an interiorly screw-threaded socket 24 into which a suitable connection on the end of the hose 4 may be screwed. The turning of the member 14 in the member 13 in one direction will unseat the valve 21 from the seat 16 thereby allowing the water to flow through the handle portion into the tubular stem 1 while the turning of the member 14 in the opposite direction will seat the valve and thus shut off the water.

The length of the handle 3 is such that in grasping it the enlarged projecting portion 23 of the rotary member 14 will be embraced in the hand as shown by dotted lines Fig. 1, and because of the fact that this portion 23 is larger in diameter than the non-rotatable section 13 the operator will have a firmer grasp or grip on the enlarged portion 23 than on the non-rotatable section 13. The advantage of this is that the operator can readily turn the section 14 to open or close the valve by twisting his wrist and without releasing his grasp on the handle for when the handle is grasped firmly in the hand the greatest gripping pressure is applied to the enlarged portion 23 of the rotatable section 14 so that as the wrist is turned the section 14 will be rotated in the section 13 while the hand will slip around the section 13.

The implement is thus very easy to manipulate and can be transported from place to place without shutting off the water and without danger that the operator will get wet from the lateral jets, or that such lateral jets will be sprayed onto flowers, grass, or other plants in the vicinity of the place where the implement is being used or while the implement is being transported from place to place. The implement also has the further advantage that the novel form of tip facilitates the penetration of the implement into soil of any character, as stated above.

25 indicates the packing at the end of the member 13 and surrounding the member 14, which packing is for the purpose of preventing leakage at this point.

27 indicates a stop ring carried by the member 14 and adapted to limit the opening movement of the valve.

The lateral delivery ports 6 may conveniently be distributed uniformly around the tubular stem so that they will provide an even distribution of water in all directions.

We claim:

1. An irrigating implement comprising a tubular stem having a wedge-shaped closed end provided with a central discharge port terminating at the edge of the wedge shape, said stem having lateral discharge ports adjacent the wedge-shaped end, and a handle element secured to the upper end of the tubular stem and extending at substantially right angles thereto, said handle element being provided with means for the attachment of a hose thereto and having a passage therethrough communicating with the bore of the stem.

2. An irrigating implement comprising a tubular stem having a wedge-shaped closed end provided with a central discharge port terminating at the edge of the wedge shape, said stem having lateral discharge ports adjacent the wedge-shaped end, a handle element secured to the upper end of the tubular stem and extending at substantially right angles thereto, said handle element being provided with means for the attachment of a hose thereto and having a passage therethrough communicating with the bore of the stem, a bell-shaped guard member slidably mounted on the stem and a stop to limit movement of said member toward the wedge-shaped end of the stem, the skirt portion of the guard when the latter is in its lowest position against the stop being placed so as to intercept the jets issuing from the lateral discharge ports.

3. An irrigating implement comprising a tubular stem having a wedge-shaped closed end provided with a central discharge port terminating at the edge of the wedge shape, said stem having lateral discharge ports adjacent the wedge-shaped end, a handle element secured to the upper end of the tubular stem and extending at substantially right angles thereto, said handle element being provided with means for the attachment of a hose thereto and having a passage therethrough communicating with the bore of the stem, a bell-shaped guard member slidably mounted on the stem and a stop to limit movement of said member toward the wedge-shaped end of the stem, the skirt portion of the guard when the latter is in its lowest position against the stop being placed so as to intercept the jets issuing from the lateral discharge ports, said stem having indication marks thereon with which the guard co-operates to indicate the depth to which the stem is inserted into the soil.

4. An irrigating implement comprising a tubular stem adapted to be inserted in the soil and having a wedge-shaped end and provided with discharge ports, a handle element secured to the upper end of the stem and extending at substantially right angles thereto, said handle element being constructed to be attached to a hose and having a passage therethrough, and a valve to control said passage, said handle element having a portion turnable about the axis thereof and constituting means for operating the valve.

OTIS H. STARNER.
HERBERT P. STARNER.